United States Patent Office 2,767,107
Patented Oct. 16, 1956

2,767,107

ANTISTATIC TREATMENT OF HYDROPHOBIC RESIN ARTICLES

Donald M. Young, Charleston, and Paul D. Berry, South Charleston, W. Va., assignors to Union Carbide and Carbon Corporation, a corporation of New York No Drawing. Application June 29, 1954, Serial No. 440,234

11 Claims. (Cl. 117—138.8)

This invention relates to the treatment of textiles and other articles made from or containing hydrophobic synthetic resins for the purpose of preventing or inhibiting the accumulation of surface charges of static electricity thereon during the production of such articles, the subsequent treatment of the articles in connection with the usual finishing operations, and during the service life of the articles. It has especial utility for the production of static-resistant textile articles made from hydrophobic resins formed by the polymerization of acrylonitrile or vinyl chloride, alone or in conjunction with another polymerizable compound such as acrylonitrile, vinyl chloride, vinyl acetate, styrene, the vinyl benzenes, the alkyl acrylate esters and corresponding alpha-methacrylate esters, and the like.

It long has been known that textile articles made from or containing vinyl resins that have substantial percentages of vinyl halide and/or acrylonitrile in the molecule tend to develop electrostatic charges during the processing of the fibers and textiles made therefrom, as well as later during use of the article.

In the past, many attempts have been made to treat such textile articles for the purpose of preventing or minimizing the accumulation of such electrostatic charges on the treated article. To be satisfactory such a treatment, while providing the treated article with anti-static protection for long periods of time, should not substantially impair such critical properties of the fibrous article as tensile strength, flexibility, elongation, resistance to chemical, bacterial and fungal agencies, and dyeability in a manner to render the treated article unsuitable for the intended use.

Heretofore various anti-static treatments have been devised that have imparted to certain hydrophobic vinyl resin textile articles more or less temporary protection against the accumulation of surface charges of static electricity. However, prior to this invention few, if any, treatments were known which, when applied to such textile articles, continued to provide the required anti-static protection after the usual commercial laundering or dry cleaning operations in use today. In general, then, it may be said that the anti-static treatments available today for textile articles made from hydrophobic resins are not permanent and usually must be renewed after each commercial laundering or dry cleaning of the article to ensure continued protection.

This invention is based in important part upon the discovery that textiles and other articles made from or containing hydrophobic synthetic resins and tending to accumulate objectionable surface charges of static electricity can have this tendency inhibited or minimized so as to provide long sustained and often substantially permanent anti-static protection by coating or impregnating such article with a polymerizable monoester or diester of certain polyethylene glycols with acrylic or methacrylic acid, or preferably with mixtures of such mono- and diesters, followed by a treatment of the article in the manner herein described in the presence of a water-soluble free-radical generating polymerization catalyst.

While the effectiveness as anti-static agents of these polymerizable compounds is illustrated herein principally in connection with textile articles made from copolymers of acrylonitrile and vinyl chloride of the type described in United States Patent No. 2,420,565, the invention is not restricted to the treatment of articles made from such copolymers but is particularly applicable to the treatment of surfaces of any articles made from or containing a hydrophobic resin, such as the polyvinyl chlorides, copolymers of vinyl chloride and a vinyl ester of a lower fatty acid, or of acrylic or alpha-methacrylic acid, polystyrenes, the ethylene glycol polyesters of terephthalic acid, polyamides, polyacrylonitriles, copolymers of acrylonitrile with vinyl acetate and with vinylidene chloride, and organic derivatives of cellulose such as cellulose acetate and the acetate-butyrate.

These esters of acrylic acid and alpha-methacrylic acid with the polyethylene glycols which have been found particularly efficacious in the process possess a structure corresponding to the formula

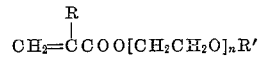

wherein R can be hydrogen or a methyl group; R' can be hydrogen, the acrylyl group or an alpha-methacrylyl group, $n$ is an integer from 3 to 80, and preferably from about 6 to about 35.

Mixtures of the mono- and diesters of these polyethylene glycols with acrylic acid or alpha-methacrylic acid commonly are prepared by the direct esterification of the acid with a polyethylene glycol of suitable molecular weight, in the presence of an esterification catalyst such as sulfuric acid, or other mineral acid, and a polymerization inhibitor such as hydroquinone, pyrogallol, picric acid and 1,3,5-trinitrobenzene.

The esterification reaction commonly is conducted in a suitable still equipped with a fractionating column, in the presence of a water-entraining agent such as benzene for removal by overhead distillation of a water-benzene azeotrope. The residual product is neutralized with an alkaline alkali metal compound such as sodium acetate before removal of the benzene. The esters can be produced by other well known processes involving ester interchange reactions.

Other polymerizable esters useful in the process are those of the foregoing formula wherein up to about one half of the number of —(CH₂CH₂O)— groups are replaced with the same number of

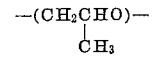

groups. Such compounds have a structure represented by the formula:

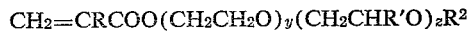

wherein each R and R', respectively, is selected from the class consisting of hydrogen and the methyl group; R² is selected from the class consisting of hydrogen and the acrylyl and alpha-methacrylyl groups; $y+z$ is an integer from 3 to 80; and $z$ is zero or a number no greater than one-half of ($y+z$). However, the compounds containing the

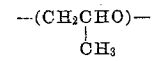

groups function somewhat less effectively than the polyethylene glycol esters. The polypropylene glycol esters of acrylic acid and of alpha-methacrylic acid do not provide satisfactory anti-static protection for these hydrophobic resin articles.

The proportion of the di-esters and mono-esters present in the ester mixtures can vary widely, ranging from mixtures containing little of the di-esters to those consisting substantially entirely of the di-esters of either of these acids, or mixtures thereof. This ratio can be controlled by varying the molar ratio of the acid and the polyglycol within the range from 1 to 2 or more mols of the acid per mol of the polyglycol during the production of the esters.

Before treating the article with the polyethylene glycol acrylate or methacrylate, the concentrated aqueous solutions thereof, which commonly contain a polymerization inhibitor for preservation purposes, have ester concentrations of as much as 40% or more. An important feature of this invention is a novel step of activating the anti-static material in such solution prior to use in manner whereby it can readily be applied to the article to be given anti-static protection and, after a brief heat treatment of the activated anti-static agent it will adhere tenaciously to the article and provide such protection during much of the service life of the article.

The critical activation of the ester solution is effected by diluting the solution with water to an ester concentration of between around 0.5% and around 8%, and preferably around 2% to 5%. A water-soluble wetting agent such as the dihexyl ester of sodium sulfosuccinic acid is added in small amount, e. g. 0.01% or more, based upon the solution weight. Preferably there is added to the diluted solution a small amount, commonly around 0.5% to 1.5%, based upon the solution weight, of a water-soluble free-radical generating polymerization catalyst. Effective catalysts are the water-soluble peroxides such as hydrogen peroxide and peracetic acid. Especially efficacious activators are the water-soluble persulfates such as potassium, sodium, and ammonium persulfates.

The diluted potentially active solution then is heated to a temperature within the range from about 50° C. to about 85° C. for from about 5 minutes to 30 minutes or more, the time ranging inversely with the temperature, to destroy any inhibitor present. Some incipient polymerization occurs but not to a sufficient extent to cause insolubilization of the ester. The ester solution then is further diluted if necessary with cold water to the desired ester concentration, which may be within the range from about 0.5% and upward, or, if undiluted, is cooled to near room temperature.

In applying the solution of the anti-static agent to the article the latter is immersed, dipped, sprayed, padded, or otherwise coated or impregnated, with the dilute aqueous solution or emulsion of the activated polyglycol esters, at temperatures around normal room temperature or above. When treating a textile article by the present process the excess of treating solution is pressed out until the textile article contains about 100%, more or less, of its weight of the solution. The treated article then is dried and cured by heating it to a temperature in the range from about 50° C. to about 200° C., and preferably from about 70° C. to about 120° C., usually for times ranging from 5 to 30 minutes or longer, the time in general varying inversely with the temperature, thereby curing the activated polyglycol esters and imparting to the article a substantially permanent anti-static surface.

Under such conditions the activated polyesters or mixture of polyesters with which the article is impregnated or coated polymerize further and are converted into a water-insoluble coating that bonds tenaciously to the article and effectively inhibits or retards the development of static electrical charges at the surface of the article, or it drains off such charges as formed.

The application of as little as 0.5% of the anti-static agents of this invention, based upon the dry fabric weight, provides a substantial degree of anti-static protection for the hydrophobic resinous article treated therewith, where long sustained or permanent protection is not essential, or where the thus treated article is not subjected to repeated washing or scouring treatments.

The following examples serve to illustrate the invention.

EXAMPLE 1

A mixture of 164 pounds (0.27 pound mol) of the polyethylene glycol having an average molecular weight of 600, 29.5 pounds (0.41 pound mol) of acrylic acid, 582 pounds of benzene, 0.09 pound of 1,3,5-trinitrobenzene and 3.88 pounds of sulfuric acid were refluxed in a fractionating still while removing water formed in the esterification reaction. The reaction was 97% complete after 15.5 hours. The sulfuric acid then was neutralized with 6.3 pounds of a 50% aqueous solution of caustic soda. About one-half of the benzene was stripped off by distillation under about 270 mm. of mercury pressure, then 250 pounds of water were added, and the balance of the benzene was removed as the azeotrope with water. The pH of the residual polyethylene glycol esters was adjusted to 5.8 with a 50% aqueous solution of caustic soda and was filtered, yielding an aqueous solution containing 40% of the polyethylene glycol acrylate ester.

Aqueous solutions of this ester were prepared containing respectively 2%, 2.5%, 3%, 4%, 5% and 6% of the ester, by weight, and 0.1% by weight of the dihexyl ester of sodium sulfosuccinic acid, and 0.5% by weight of potassium persulfate. Swatches of knitted tubing made from yarns formed of an acrylonitrile-vinyl chloride copolymer resin containing 40% of acrylonitrile and having a specific viscosity of about 0.3 at 20° C. in cyclohexane were immersed in the respective solutions, and were then wrung out to about a 100% solution pick-up, based on the weight of the untreated swatch, and were air dried at room temperature. The dried swatches then were cured by heating in an oven at 120° C. for thirty minutes.

The cured swatches were subjected to anti-static evaluation tests and washing tests, with the results given in Table 1.

Table 1

| Treating solution, percent, of anti-static agent, by wt. | Treated Textile, percent anti-static agent, by wt. | No. of washes [1] | Evaluation after washing, Volume Resistivity |
|---|---|---|---|
|  |  |  | Ohm cm. |
| 2 | 2 | 20 | $1 \times 10^9$ |
| 2.5 | 2.4 | 30 | $5 \times 10^9$ |
| 3 | 3.1 | 50 | $2 \times 10^9$ |
| 4 | 4.6 | 50 | $1 \times 10^9$ |
| 5 | 5.5 | 50 | $7 \times 10^8$ |
| 6 | 6.5 | 50 | $2 \times 10^9$ |

[1] Each wash represents one complete cycle of a "Frigidaire" automatic Home laundry machine, using in the wash stage water at 140° F. containing standard detergent, and using two rinse stages with water at 100° F.

In the electrical resistivity measurement, the electrical resistance in ohms of 8 strands of the textile yarn being examined is measured by being secured between two terminal clamps spaced approximately 2 inches apart of an Ultrohmeter manufactured by Beckman Instrument Company, Pasadena, California. The resultant value for resistance is converted to volume resistivity (ohm cms.) employing the following formula:

$$\text{Volume Resistivity} = \frac{\text{Resistance} \times \text{Wt. of fiber between clamps}}{\text{Density of the fiber} \times (\text{distance between clamps})^2}$$

Volume resistivity values of $5 \times 10^9$ ohm cm. or less are desirable for the best static protection.

EXAMPLE 2

The following were mixed and refluxed for 16 hours in a fractionating still: 1800 grams (3 mols) of polyethylene glycol of average molecular weight 600, 324 grams (4.5 mols) of acrylic acid, 1800 grams of benzene, 0.32 gram of hydroquinone, 0.61 gram of 1,3,5-trinitrobenzene, and 19.6 grams of sulfuric acid. Water formed in the reaction was removed overhead and collected. After 94% of the acrylic acid had been esterified, the acid catalyst was neutralized with sodium acetate, the mixture was filtered, and benzene was removed from the filtrate by distillation under 150 mm. of mercury pressure. An aqueous solution containing 42% of the polyglycol acrylate mixture was secured.

Aqueous solutions of these esters were prepared containing 2% thereof, 0.1% of the dihexyl ester of sodium sulfosuccinic acid, being marketed under the trade name "Aerosol MA," and 0.5% of potassium persulfate, all by weight.

In each solution was placed a fabric made from a different hydrophobic fiber, as indicated in the following Table 2. The solutions containing the various fabrics then were heated at 70° C. during 30 minutes, after which the fabrics were wrung to about 100% solution pickup and then heated at 120° C. for 30 minutes. Table 2 shows the anti-static protection provided the various fabrics by the treatment, after five complete cycles in a nationally known home laundry machine, using water at 140° F. containing a standard detergent in the washing stage and using two rinsing stages with 100° F. water.

*Table 2*

| Fiber used | Volume Resistivity | |
|---|---|---|
| | Untreated article | Treated article, after 5 washing cycles |
| | Ohm cm. | Ohm cm. |
| Fiber A | 9×10$^{10}$ | 1×10$^9$ |
| Fiber B | 1×10$^{11}$ | 7×10$^8$ |
| Fiber C | 1×10$^{11}$ | 2×10$^9$ |
| Fiber D | 2×10$^{11}$ | 2×10$^9$ |
| Fiber E | 3×10$^{11}$ | 6×10$^{10}$ |

In Table 2, fiber A was a commercially available fiber, mostly polyacrylonitrile, being marketed under the trade name "Orlon";

Fiber B was made from a copolymer of acrylonitrile and vinyl chloride containing about 40% of acrylonitrile in the polymer;

Fiber C was made from polyethylene terephthalate, and is being marketed under the trade name "Dacron";

Fiber D was made from cellulose acetate; and

Fiber E was made from nylon.

After 75 or more washings in the automatic washer, none of the said fabrics showed appreciable static generation up to the point where they became too ragged to test further.

EXAMPLE 3

Following the general procedure described in Example 2, with the exception that the polyethylene glycol designated below was used (in the same molar ratio to acrylic acid) in place of the PEG 600 of that example, six runs were made, using polyethylene glycols having average molecular weights of 200, 400, 600, 1000, 1500 and 3500, respectively.

Six treating solutions were made by heating to 70° C. an aqueous solution of "Aerosol MA" and adding a corresponding polyethylene glycol acrylate, followed by potassium persulfate to form a solution containing 0.1% of "Aerosol MA," 4% of the polyethylene glycol acrylate, and 0.5% of potassium persulfate, all by weight. After heating at 70° C. for 30 minutes each solution was diluted with cold water to reduce the acrylate concentration to 2% by weight.

Swatches of tube knit fabric made of an acrylonitrile-vinyl chloride copolymer containing 40% of acrylonitrile in the polymer were dipped in the respective diluted solutions and were wrung to 100% solution pick-up. These samples were air dried for 90 minutes, and then were heated for 30 minutes at 110° C. The treated fabrics then were subjected to the resistivity tests described herein. The results are presented in Table 3.

*Table 3*

| Glycol used in preparing the esters | Volume resistivity after 5 washings | No. of washings before resistivity reached 5×10$^9$ or higher |
|---|---|---|
| | Ohm cm. | |
| PEG 200 | 7×10$^{10}$ | 5 |
| PEG 400 | 3×10$^9$ | 30 |
| PEG 600 | 9×10$^8$ | 50 |
| PEG 1000 | 4×10$^8$ | 50 |
| PEG 1500 | 3×10$^9$ | 10 |
| PEG 3500 | 8×10$^{10}$ | 5 |

PEG=polyethylene glycol. The appended numeral designates the average molecular weight of the polyglycol.

EXAMPLE 4

Following the general procedure described in Example 2, a mixture of 200 grams (0.33 mol) of polyethylene glycol (av. mol. wt. 600), 43 grams (0.5 mol) of alpha-methacrylic acid, 750 grams of benzene, 0.14 gram of hydroquinone and 5 grams of sulfuric acid was reacted. The glycol was heated at 135° C. for 4 hours and then the other materials were mixed therewith and the mixture refluxed as in Example 2. After 16 hours 92% of the methacrylic acid had reacted, and the sulfuric acid was neutralized with sodium acetate, and the benzene was removed by distillation and replaced with water. An aqueous solution containing 27% of the esters was obtained.

An aqueous solution was prepared containing 0.1% of a wetting agent, 0.5% of potassium persulfate and 2% of the polythylene glycol methacrylate ester and was heated to 70° C. for 30 minutes to destroy the polymerization inhibitor. A quantity of a tube knit fabric, made from the copolymer resin mentioned in Example 3, was immersed in the solution, held at 70° C., and then was wrung by hand and heated in an oven at 120° C. for 30 minutes. The total amount of antistatic agent deposited amounted to about 2%.

The treated fabric was then washed in accordance with the No. 3 cotton wash test described in the 1950 Textile Manual and Yearbook of the American Association of Textile Chemists and Colourists, vol 26, pp. 84–85.

The washed fabric then was subjected to resistivity tests of the general type herein described, in comparison with another sample of the treated material that had not been washed, with the following results:

Volume resistivity
Before washing _____ 7.7×10$^6$ ohm cm.
After washing _____ 4.5×10$^8$ ohm cm.

EXAMPLE 5

Following the general procedure described in Example 4, a mixture of 200 grams (0.32 mol) of mixed polyethylene glycol and polypropylene glycol having an average molecular weight of 626, 34.5 grams (0.48 mol) of acrylic acid, 200 grams of benzene, 0.02 gram of 1,3,5-trinitrobenzene and 1.1 grams of sulfuric acid were reacted at reflux temperature, yielding the corresponding acrylate esters of the mixed glycol, which was insoluble in water.

The polyglycol used in this example was prepared by reacting 201 grams ethylene oxide with 425 grams (1 mol) of polypropylene glycol of av. mol. wt. 425, using 0.5% of potassium hydroxide as catalyst.

An aqueous suspension of the ester was prepared in the manner described in Example 4, and a quantity of the fabric described in that example was treated with the solution in the same manner.

The treated fabric then was washed in accordance with #3 cotton fiber wash test described in the 1950 Textile Manual and Yearbook of the American Association of Textile Chemists and Colourists, vol. 26, pp. 84–85. The washed treated article and the treated but unwashed article had the following volume resistivity values:

Before washing _____ $1.3 \times 10^7$ ohm cm.
After washing _____ $2.4 \times 10^8$ ohm cm.

Polyethylene glycol acrylates and methacrylates having average molecular weights around 3500 have been found to impart some antistatic protection when applied to articles made of hydrophobic resins by the process. However those having average molecular weights in the range from around 300 to around 1600 are preferred where antistatic protection is sought for the article during all or most of its active service life.

The invention is susceptible of modification within the scope of the appended claims.

We claim:

1. Process for reducing the tendency of articles containing or made from hydrophobic synthetic resins to accumulate surface charges of static electricity, which comprises applying to the surface of such an article an activated liquid composition containing as an essential antistatic ingredient a polyalkylene glycol ester having a structure represented by the formula:

$$CH_2=CRCOO(CH_2CH_2O)_y(CH_2CHR'O)_zR^2$$

wherein R and R', respectively, are selected from the class consisting of hydrogen and the methyl group; $R^2$ is selected from the class consisting of hydrogen and the acrylyl and alpha-methacrylyl groups; and $y+z$ is an integer from about 3 to around 80; and $z$ is zero or a number no greater than one-half of $(y+z)$; said liquid composition also containing a free-radical generating polymerization catalyst, drying the treated article, and heating it to a temperature within the range from around 70° C. to around 120° C. for a period of from 5 minutes to at least 30 minutes.

2. Process as defined in claim 1 wherein the said liquid composition is an aqueous solution containing between around 0.5% and around 8% by weight of a mixture of polyethylene glycol acrylates having average molecular weights between around 300 and around 1600.

3. Process as defined in claim 1 wherein the said liquid composition is a dilute aqueous solution containing between around 0.5% and around 8% by weight of a mixture of polyethylene glycol acrylates having average molecular weights between around 300 and around 1600, said solution also containing a wetting agent for such article surface.

4. Process as defined in claim 1 wherein the said liquid composition is an aqueous solution containing between around 0.5% and around 8% by weight of a mixture of polyethylene glycol alpha-methacrylates having average molecular weights between around 300 and around 1600, said solution also containing a wetting agent.

5. Process as defined in claim 1 wherein said liquid composition has been activated prior to applying it to the surface of said article by heating it for at least 5 minutes to a temperature within the range from 50° C. to 85° C., the time varying inversely with the temperature.

6. Process as defined in claim 1 wherein the said article is made of a resinous polymer containing acrylonitrile.

7. Process as defined in claim 1 wherein the said article is made of a resinous polymer containing vinyl chloride.

8. Process as defined in claim 1 wherein the said article is made of a resinous copolymer of acrylonitrile and vinyl chloride.

9. Process as defined in claim 1, wherein the said polymerization catalyst is peracetic acid.

10. Process for reducing the tendency of articles containing or made from hydrophobic synthetic resins to accumulate surface charges of static electricity, which comprises applying to the surface of such an article an activated liquid composition containing as an essential antistatic ingredient a polyalkylene glycol ester having a structure represented by the formula:

$$CH_2=CRCOO(CH_2CH_2O)_nR^2$$

wherein R is selected from the class consisting of hydrogen and the methyl group; $R^2$ is selected from the class consisting of hydrogen and the acrylyl and alpha-methacrylyl groups; and $n$ is an integer from about 3 to about 80; said liquid composition also containing a free-radical generating polymerization catalyst, drying the treated article, and heating it to a temperature within the range from about 70° C. to about 120° C. for a period of from 5 minutes to at least 30 minutes.

11. Process as defined in claim 10, wherein the said polymerization catalyst is peracetic acid.

References Cited in the file of this patent

UNITED STATES PATENTS

| | | |
|---|---|---|
| 2,393,863 | Myers | Jan. 29, 1946 |
| 2,468,094 | Marks | Apr. 26, 1949 |
| 2,543,539 | Wizon | Feb. 27, 1951 |
| 2,611,195 | Brophy | Sept. 23, 1952 |
| 2,618,621 | Burt | Nov. 18, 1952 |